Figure 1:
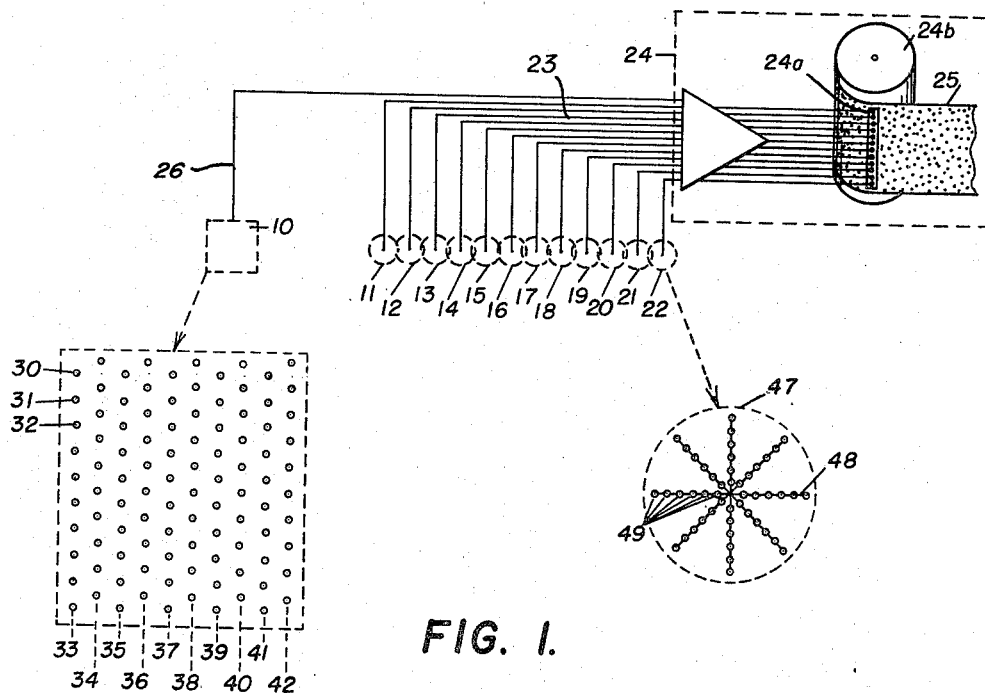

May 4, 1965

G. W. EHLERT ETAL 3,181,643

COMBINING MULTIPLE SEISMIC RECORDS

Filed July 29, 1959

3 Sheets-Sheet 1

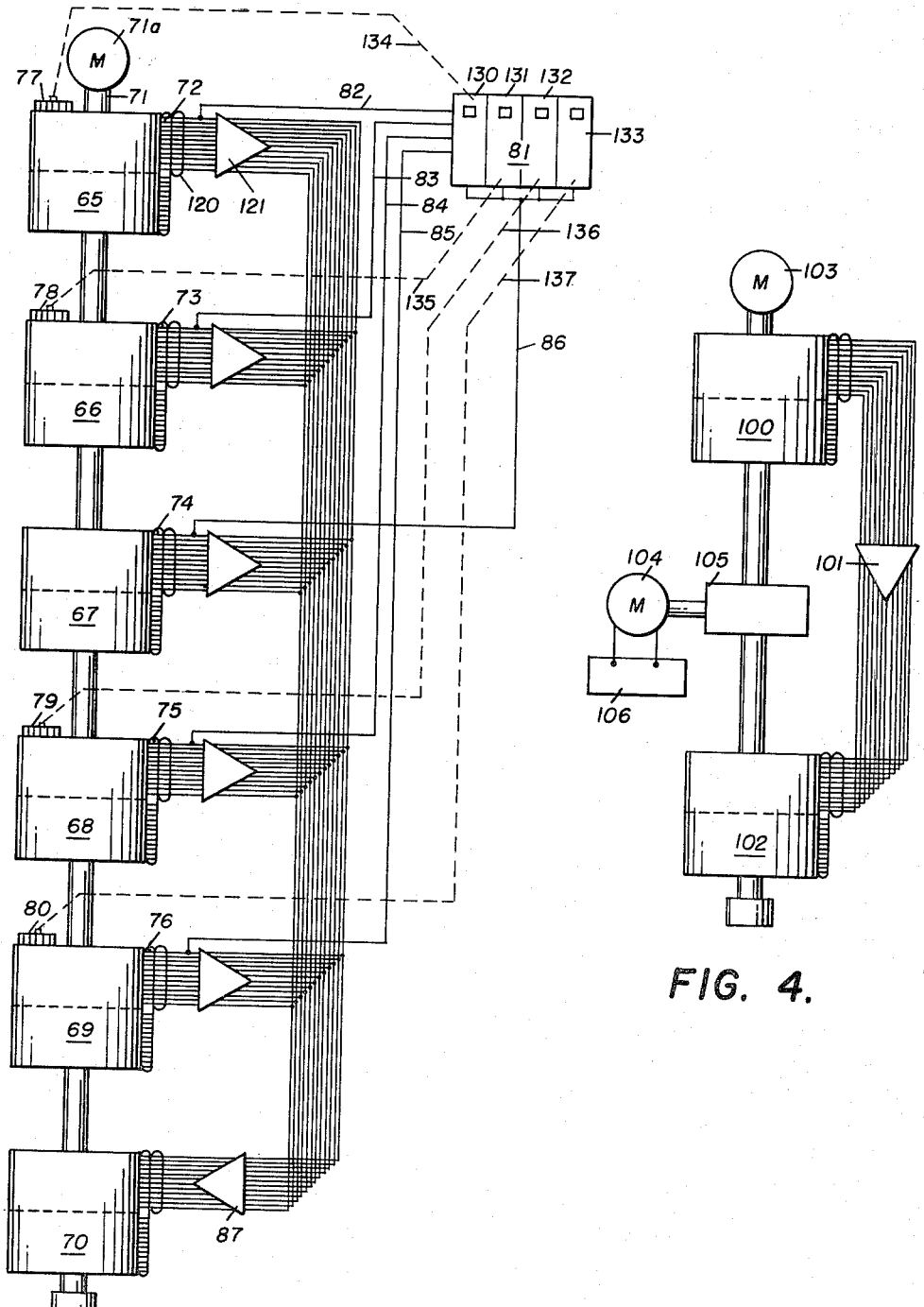

May 4, 1965

G. W. EHLERT ETAL 3,181,643

COMBINING MULTIPLE SEISMIC RECORDS

Filed July 29, 1959

3 Sheets-Sheet 3

United States Patent Office 3,181,643
Patented May 4, 1965

3,181,643
COMBINING MULTIPLE SEISMIC RECORDS
Gilbert W. Ehlert, Albert W. Musgrave, Paul E. Nash, and Roderick M. Nugent, all of Dallas, Tex., assignors to Socony Mobil Oil Company, Inc., a corporation of New York
Filed July 29, 1959, Ser. No. 830,289
7 Claims. (Cl. 181—.5)

This invention relates to seismic exploration and to a method and system for accommodating multiple events for the production of a seismic record.

The reflection seismograph has been employed for determining the character of subsurface formations in order to direct the recovery of subsurface deposits such as oil, gas, and other minerals. In many areas, it is extremely difficult, if not impossible, to secure seismic data of such quality as to permit interpretation using conventional techniques. In order to overcome such problems, multiple sources have been used along with detectors whose numbers have reached the order of hundreds or thousands. By thus creating the input and output seismic signals, a substantial step has been taken in increasing the signal-to-noise ratio. However, even further improvement is desired.

Further investigations have led to the present invention in which a plurality of separate seismic events are created successively at a given sending station. Following each such event the resultant seismic waves are detected as they arrive at each of a plurality of detecting stations. A primary record of the resultant arriving seismic waves is then secured, the arrival of the seismic waves being related to the time of generation thereof at the sending station. Such a primary record is produced following the creation of seismic waves at each of a plurality of points selected within the area of a sending station. Primary records thus produced from arrangements wherein substantially the same spacing between points of generation and the detector stations exist are then combined to form a secondary record. Groups of secondary records thus produced are corrected for differences in distance between generation and detection stations to produce a set of corrected records. Combined signals from each detecting station appearing on each of the corrected records are then combined to form composite signals which are recorded with respect to a corrected zero time to form a single final record of signals numbering the same as on said primary record but in which there have been enhanced the signal-to-noise ratio in dependence upon the number of signals generated at the sending station and the number of detectors contributing to the output from each detecting station.

Further, in accordance with the present invention, there is provided a method of seismic exploration wherein seismic waves are sequentially generated at each of a plurality of spaced points in an area defining a sending station and are detected at a plurality of detecting stations in a line along a detecting spread extending away from the sending station. The seismic signals produced by the detecting stations are separately recorded. Then, the recorded signals from each detecting station resulting from seismic waves generated at a plurality of points in the area of the sending station extending along a line perpendicular to the detecting spread are directly combined in the absence of any changes in relative time-phase relationships between them to produce a first multisignal composite record. The recorded signals from each detecting station resulting from seismic waves generated at a second plurality of points extending along a second line perpendicular to the detectors and spaced from the first line are directly combined in the absence of any changes in relative time-phase relationships between them to produce a second multisignal composite record. Next, the relative time-phase relationships of signals on the composite records are adjusted for the differences in the distances between the first and second lines and the detecting stations to produce first and second corrected multisignal composite records. Finally, the signals from each detecting station on the corrected composite record are combined to produce a final multi-signal composite record.

Figure 5:
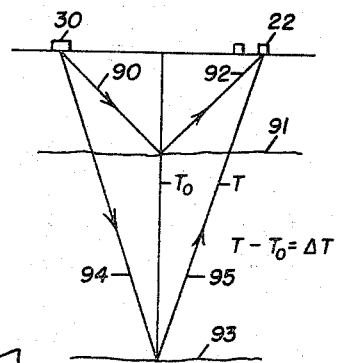
Figure 6:
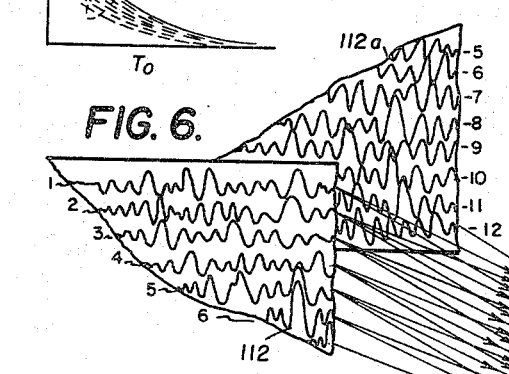
Figure 11:
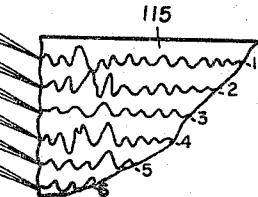
Figure 3:
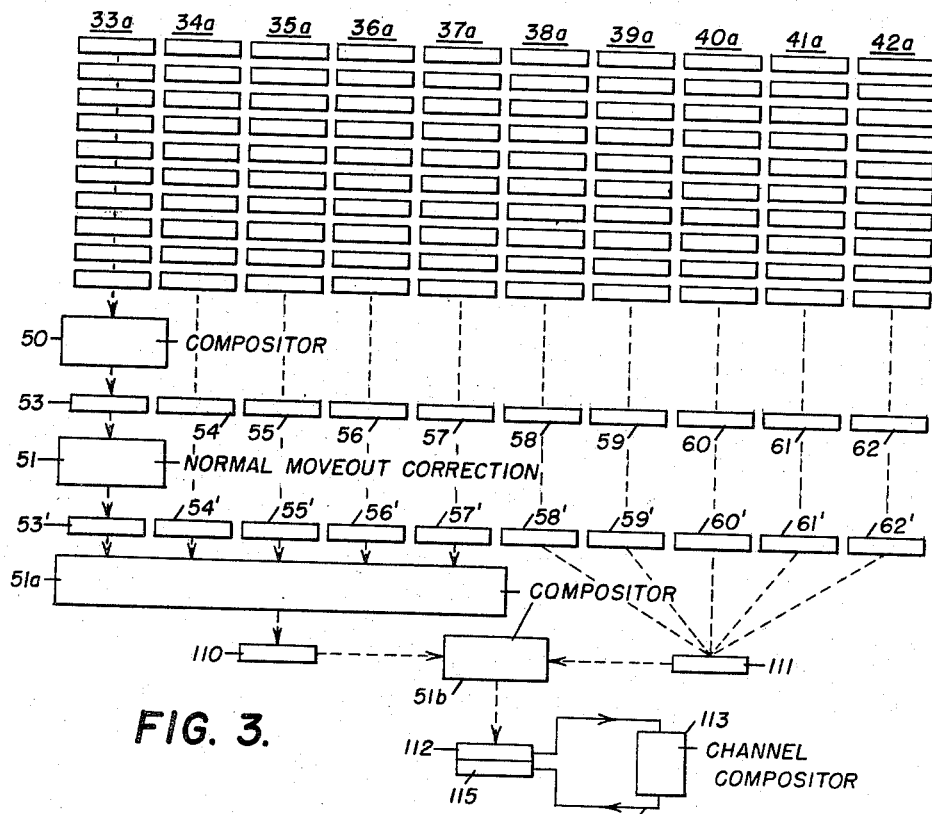

For a more complete understanding of the present invention and for further objects and advantages thereof, reference may now be had to the following description taken in conjunction with the accompanying drawings in which:

FIG. 1 diagrammatically illustrates a field exploring system;
FIG. 2 illustrates a system for carrying out a first step in processing data obtained in accordance with FIG. 1;
FIG. 3 is a data flow chart;
FIG. 4 illustrates a system for carrying out a second step in processing seismic data;
FIG. 5 is a representation of wave paths;
FIG. 6 is a family of curves representative of normal moveout correction;
FIGS. 7–10 are representations of field operations; and
FIG. 11 illustrates a trace compositing operation.

Referring to FIG. 1, there is illustrated a seismic exploring system which comprises a sending station 10 and a plurality of receiving stations 11–22. The sending station and the detecting stations are connected by way of signal channels 23 to a recorder 24. Operation is such that for each seismic impulse produced at sending station 10 there is produced a separate seismogram such as seismogram 25. Each seismogram is a record of waves produced by an impulse generated at the sending station. It has been found that waves resulting from a plurality of seismic impulses recorded in reproducible form may be combined to produce a single record in which the signal-to-noise ratio is so enhanced as to permit a more definite and certain interpretation of the seismic data than has been found to be possible using more conventional techniques. Seismic impulses may be generated by detonation of an explosive charge, impact of a weight dropped from suitable height, or other such means known in the art.

In accordance with the present invention, the detector station may comprise a substantial area in which seismic disturbances are successively created at different ones of a plurality of spaced-apart points. As illustrated in the enlarged portion of FIG. 1, a plurality of source points such as 30, 31, 32, etc. are located along a straight line 33 which is perpendicular to a line (not shown) extending from the center of the sending station 10 through the centers of the detector stations 11–22. At least one seismic impulse is generated at each of the source points 30, 31, 32. More particularly, a seismic impulse is first generated at source point 30 and a first record is secured. A second seismic impulse is then generated at source point 31 and a second seismogram is secured. Operations are then continued until all selected source points on line 33 are utilized, resulting in the production of a corresponding number of seismograms.

Following generation of each seismic impulse, the resultant seismic signals traveling by the various possible paths appear and are detected at the locations of a plurality of detector stations. In the system illustrated in FIG. 1, twelve detector stations 11–22 are employed so that record 25 comprises twelve distinct channels. Each channel is a record representative of seismic waves appearing at one of the detecting stations.

Seismic disturbances are also produced sequentially at source points along each of a plurality of lines parallel to line 33. In accordance with one mode of operation and the example which will be described in detail in the present application, source points located on ten lines, such as line 33, comprised each sending station. The source points were located at spaced points corresponding with the apexes of equilateral triangles along lines 33-42. In a specific case, the spacings between source points were sixty feet. It is to be understood however that this spacing may be varied from thirty feet to one hundred feet, or more, depending upon the nature of the area in which the operations are conducted and the signal wave length with respect to which preferential treatment is desired.

At each of the detector stations 11-22, a plurality of individual seismic detectors were employed and connected so that the output signals therefrom were combined to form a single electrical signal to be applied by way of cable 23 to the recording system 24. As illustrated in the enlarged dotted circle 47 of FIG. 1, eight radial lines or cables such as line 48 extend from a common center point. Along each such line there are located six seismic detectors such as detectors 49. In a specific example herein employed, the detectors were spaced thirty feet apart so that the area covered by the detecting station was a circle one hundred eighty feet in radius. The distance between the center of the sending station 10 and the first detecting station 11 was about one-third of a mile. The spread length, the distance between centers of the two remote detecting stations 11 and 22, was approximately two-thirds of a mile.

In carrying out the present invention, seismic disturbances were generated at the source points 30, 31, 32, etc. in the area of the sending station 10 by the impact at each source point of a relatively large weight suspended above the earth's surface and dropped in synchronism with the operation of the recording system 24. A drum-type recording system was employed. There was produced coincident with the generation of each seismic disturbance a timing marker which was transmitted to the recording system 24 as by way of channel 26. Thus, record 25 included twelve signal channels upon which the seismic signals were recorded and also a record of the timing marker generated at the time of generation of each seismic disturbance.

While various specific types of recording systems may be employed, it has been found preferable to utilize a system of the type wherein a magnetic tape is mounted on a drum and driven at constant speed past a set of recording heads. In FIG. 1, such a system has been shown in diagrammatic form. Recording heads 24a are positioned adjacent the periphery of drum 24b; the drum driven by suitable means (not shown) is rotated cyclically past the recording heads. A magnetic tape 25, shown partially removed from drum 24b, is adapted to receive signals from the recording heads 24a. Twelve signal channels in the system shown are thus provided for recording a corresponding number of seismic signals in a side-by-side relationship along the length of the magnetic record 25.

In FIG. 2, part of a system for processing data from the recording system 24 has been shown. The operation thereof may best be understood by considering the data flow chart of FIG. 3. In FIG. 3, record 25 together with other records obtained by generating seismic disturbances along line 33 have been arranged in column 33a. Similarly, the records obtained from operations along lines 34-42 have been arranged in columns 34a-42a. The flow of data represented by the seismograms of columns 33a-42a is accomplished through the use of the systems shown in FIG. 2 and in FIG. 4. The operations include combining all of the ten records in column 33a of FIG. 3 to form a single record 53. All records is column 34a are combined to form a single record 54. In similar manner, records 55, 56, 57, 58, 59, 60, 61, and 62 are produced. Preferably in combining records to produce records 53-62, there will be introduced in the compositor 50 those corrections necessary to compensate for variations in elevation and weathering thickness at each of the source points.

More particularly, the first five records in column 33a are placed on playback drums 65-69. Drums 65-69 along with a recording drum 70 are mounted on a common shaft 71 driven by motor 71a at a speed which is preferably maintained uniform and which is substantially the same as the speed of the corresponding recording drum 24b of FIG. 1. Signals from the twelve signal channels on each of said first five records are then cyclically reproduced as the surfaces of the drums 65-69 are driven past the pickup units 72-76. By this means, five records of twelve channels each simultaneously are reproduced. By means of an adjusting mechanism represented by the adjusting wheels 77, 78, 79, and 80, drums 65, 66, 68, and 69 may be independently shifted or rotated relative to the center drum 67. More particularly, rotation of wheel 77, for example, will rotate drum 65 on shaft 71 relative to the other drums. This adjustment may be made manually. Shift mechanisms 77-80 thus adjusted align the timing markers on the records of drums 65, 66, 68, and 69 with the timing mark on the record on drum 67. Proper adjustment is aided by means of a counting unit 81 in which there are provided four separate timing channels. The timing channels are connected by way of signal conductors 82, 83, 84, and 85 to the output circuit leading from each of the pickup units 72, 73, 75, and 76 on which the timing markers appear. A reference time channel 86 extends from the output circuit of pickup unit 74 to counter 81. When the timing marker recorded on drum 67 is reproduced and appears on conductor 86, the counters in unit 81 initiate timing operations. Timing operations are terminated by appearance of timing markers on channels 82-85. The measurements appearing on the counting unit 81 indicate the difference in time between the appearance of the timing marker on one of the records relative to timing markers on the four remaining records. The shifting devices 77-80 are adjusted after successive cycles of reproduction of the timing markers until the time differences indicated by timing unit 81 are substantially less than one millisecond.

Following the foregoing time shift adjustments which compensate for variations from record to record in the instant of generation of seismic disturbances at the source points relative to a given point on recording drum 24b of FIG. 1, the recording control unit 87 is energized during one cycle of reproduction of the records on drums 65-69 so that there is recorded on the record medium on drum 70 signals which are representative of the sum of those signals from the five records reproduced. In the latter operation, the signals reproduced from each detecting station are separately combined to form a plurality of composite signals in number equal to the number of detecting stations. After the record on drum 70 has been completed, the second set of five records represented in column 33a of FIG. 3 are similarly combined to form a second such composite record. The two composite records from the primary records of column 33a are then combined to form the single record 53 of FIG. 3.

The foregoing operation wherein the composite records of five primary records each was adopted was so limited only because the system upon which the FIG. 2 was based included five playback drums and one recording drum. It will readily be appreciated that the number of drums may be varied as well as the number of source points at any given line, such as line 33, FIG. 1, in order to produce composite records, such as record 53. Records may thus be produced, each being a multitrace representation of a plurality of primary seismograms produced from seismic disturbances initiated at a plurality of points, each approximately the same distance from the detecting stations.

In a similar manner, the records in column 34a are combined to produce composite record 54. The remaining records of the remaining columns 35a–42a are then composited to produce records 55–62.

It is then desired to combine records 53–62 to form a single composite record; one record representative of all of the energy generated at all of the source points in sending station 10 as detected at the detecting stations 11–22. However, since the lines 33–42 are substantially different distances from the detector stations, it has been found desirable to introduce compensation for such different distances in order to combine records 53–62 such that desired information will be recorded with substantially the same time relationships. It is to be recognized that noise energy will not consistently reappear in each of the records of FIG. 3 so that substantial noise cancellation will be obtained while repetitive addition of the desired signals may be accomplished.

The correction introduced into the records 53–62 generally understood to be "normal move out correction," is accomplished through the use of the system shown in FIG. 4. The time-phase relationships of the signals on each of the records are modified to correct the differences in path lengths as between lines 33–42 as more clearly shown in FIG. 5. A seismic disturbance created at source point 30, FIG. 5, will travel by way of ray path 90 to a shallow reflecting horizon 91 where it will be reflected by way of path 92 to a detecting station 22. Travel of the seismic wave to a deeper horizon 93 would be by way of incident path 94 and reflection path 95. It is desired that a correction function describing the variation with time between the length of such travel paths and the length of a vertical travel path be computed and utilized for correcting each seismogram 53–62. It is well understood that the correction $\Delta T$ at any given record time T is equal to $T-T_0$ where $T_0$ is the 2-way vertical travel time. More particularly, it is desired that all of records 53–62 be so compensated as to represent travel along a vertical path only.

In FIG. 6 there have been plotted a family of curves representative of variation in such correction factor $\Delta T$ as a function of time after generation of each seismic wave. The solid curve 96 of FIG. 6 may represent variation in the correction factor for those paths between source point 30 and detecting station 22. The family of curves 97 represent variations in the correction factor $\Delta T$ for detector stations closer to the sending station than detector station 22.

In order to introduce the desired correction function, each of the records 53–62 may be placed successively on reproducing drum 100 of FIG. 4. The signals are then reproduced and applied by way of a transmission unit 101 to a record medium on a recording drum 102. If a trace-by-trace correction is to be made, rather than simultaneous correction of all the traces, the drums 100 and 102 will be rotated as by motor 103 with the drum 100 rotating at a substantially constant speed. A second motor 104 coupled to a differential unit 105 and energized under the control of unit 106 may then be employed to vary during each cycle of the drum 102 the relative position of drum 102 with reference to drum 100. More particularly, on a first revolution of drum 100 corresponding with a first playback cycle of the signals on the record placed thereon, one of the channels through unit 101 will be closed so that the signal on that channel will be recorded on drum 102. Assuming that this channel represents the signal from the detector location most remote from the sending station, the relative movement introduced by differential 105 may correspond with the function represented by curve 96 of FIG. 6. On the next succeeding revolution of drum 100, the first channel will be deenergized and a second channel corresponding with the next most remote detecting station will be closed for recording a signal thereon on drum 102. On this cycle, the relative movement between drums 100 and 102 introduced by differential 105 may correspond with the second function 98 of FIG. 6. In a similar manner, the remaining ten signals from the record on drum 100 may be corrected for normal moveout by altering the time-phase relationships of the signals on such channels in dependence upon functions of lesser variation than functions 96 and 98.

All signals on a given record may be simultaneously corrected if a multichannel corrector is employed. More particularly, all signals on a single cycle of reproduction may be applied to suitable signal channels which will be so adjusted as to introduce correcting functions bearing relationships above described and illustrated in FIG. 6.

Records 53′–62′ are statically and dynamically time corrected records, the dynamic time correcting operation having been carried out by means indicated by the unit 51, FIG. 3. The corrected records are then placed in groups of five onto playback drums 65–69 (FIG. 2). With timing markers aligned through the use of counter 81, records 110 and 111 are successively produced. The latter compositing operation is indicated by the unit 51a of FIG. 3. Each of the latter records represents the composite of all of the signals produced by generating seismic waves at source points on five of the lines 33–42. Records 110 and 111 are then placed on two of the reproducing drums of FIG. 2, aligned in time, and then composited to form the single output record 112, the latter compositing operation being indicated by the unit 51b of FIG. 3. Record 112 is thus the composite of one hundred separate seismograms shown in columns 33a–42a. It includes separate signals or signal channels in number corresponding with the number of detecting stations initially used in the detecting spread and is characterized by signal-to-noise emphasis through simultaneous reproduction and compositing of as many signals as detected in the detecting spread.

Figure 7:
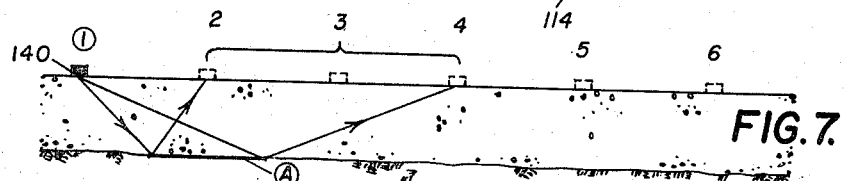

This method has been employed and found to be more advantageous in providing a continuous record of subsurface reflecting beds located beneath a selected seismic traverse. One field procedure for carrying out surveying is illustrated in FIGS. 7–10. More particularly, skip continuous seismic operations represented in FIG. 7 are operations wherein the sending station is located at station 1 and the detecting spread is located between stations 2 and 4. Where sending stations are spaced one-third of a mile apart, detecting stations are located to span two-thirds of a mile with the centers between detecting stations of the order of two hundred ninety feet. In the operation illustrated in FIG. 7 and the compositing operations above described, the subsurface segment A will be delineated by the resultant composite seismogram. The field system is then changed to conform with FIG. 8 wherein the sending station is at station 4 and the detecting stations span the distance between stations 1 and 3. By this means, the subsurface segment B will be delineated. The system is then changed to that shown in FIG. 9 where the sending station is at station 3 and the detectors span the length between stations 4 and 6. By this means, segment C is delineated. The system is then changed to that shown in FIG. 10 where the sending station is at station 6 and the detectors span the interval between stations 3 and 5 to delineate subsurface segment D. For each of the operations illustrated in FIGS. 7–10, there will be ultimately produced a record such as record 112.

It has been found desirable to composite adjacent traces on records such as record 112 which delineate adjacent subsurface segments so that records from operations such as illustrated in FIGS. 7–10 may be tied together to complete a survey along a given line.

In FIG. 3, one operation in which adjacent traces are composited is schematically indicated. Twelve signals on record 112 are applied to a mixing system 113 having an output represented by channel 114 such that flow of data is back to record 115. A selected playback sequence may thus be followed in unit 113 so that the desired mixing or compositing of adjacent traces is accomplished.

More particularly, and as shown in detail in FIG. 11, a segment of records 112 and 115 have been shown with the signal channels indicated in visual form, it being understood that reproducible-type recordings will comprise at least record 112. Traces 1, 2, and 3 of record 112 are added together to form trace 2 of record 115. Similarly, traces 2, 3, and 4 of record 112 are combined to produce the signal recorded to form trace 3 of record 115. Thus, each trace on record 115 comprises the sum or some other selected combination of three adjacent traces from record 112.

Figure 8:
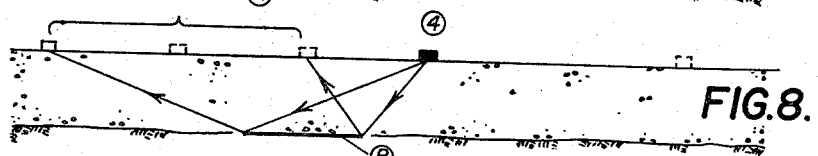
Figure 9:
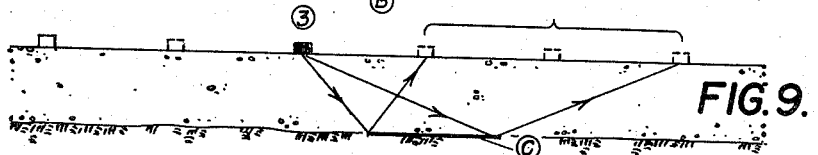
Figure 10:
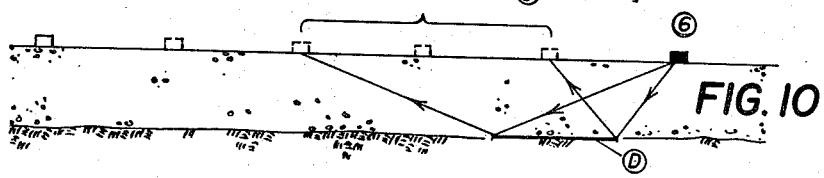

In order to interpret seismic records relating to segment A, FIG. 7, in their proper relation with respect to those relating to segment B, FIG. 8, signals from two records relating to such adjacent subsurface segments may be composited. More particularly, assuming that record 112 was secured through operations indicated in FIG. 7 and that record 112a of FIG. 11 includes signals relating to a subsurface segment adjacent to segment A, FIG. 7, then trace 1 of record 115, FIG. 11, may comprise the sum of the signals recorded on channels 1 and 2 of record 112 and the signal recorded on channel 12 of record 112a, flow of data in the course of trace compositing operations being indicated by the arrows 150 of FIG. 11.

It will be apparent that more or less extensive trace compositing such as described immediately above may be employed. Where trace compositing is employed, the top and bottom channels on each set of mixed records will include signals from at least two records of reflections from adjacent subsurface reflecting segments.

The foregoing description has related to the operation of the systems shown in FIGS. 1, 2, and 4 to produce a desired composite record. The drawings indicate that only one-half the capacity of the recording units 65-70, 100, and 102 has been used. In actual field practice the recording system employed was a single drum unit rather than the multidrum system shown in FIG. 2. The field recording system as well as the system of FIG. 2 was capable of recording or reproducing twenty-four signals simultaneously at each drum. However, since only twelve detecting stations were employed, two records were recorded in the field on each magnetic tape. Such tapes were reproduced as through the use of the system of FIG. 2, twelve traces from each record at a time. More particularly, in the system shown in FIG. 2, element 120 represents a multichannel plug or other suitable switching means whereby the input channels leading to amplifier 121 may be connected first to the upper twelve reproducing channels in playback head 72 in order to reproduce and transmit to drum 70 seismic signals recorded on the upper half of the tape on drum 65. Plug 120 may then be connected to the lower twelve channels in detecting head 72 for reproduction and transmission to drum 70 of the signals on the lower half of the tape on drum 65. Thus, the five tapes on drums 65–69 include ten seismograms of twelve channels each, each produced by generating seismic waves along a line in the source pattern such as line 33. The upper twelve channels on each of the tapes are first reproduced and combined for recording on a first tape on drum 70. Plugs such as plugs 120 are then connected to the lower twelve channels, and the remaining five records are reproduced and are combined for recording on a second tape on drum 70. In each case, timing markers on the five records reproduced are aligned through use of indicator 81 and adjusting mechanism 77-80. The two records thus produced on drum 70 are then placed on two of the drums 65-69, timing markers are aligned, and the records are then reproduced and combined to form a single record such as record 53 of FIG. 3.

The foregoing is one variation of several possible ways of compositing a plurality of records through use of compositors indicated generally in FIG. 3 by the unit 50. Although the field procedures indicated in FIGS. 1 and 7-10 may be varied, the compositing through the use of the systems of FIGS. 2 and 4 to cause a flow of data such as illustrated in FIG. 3 has been found to be highly desirable for seismic exploration.

In connection with actual field operations illustrated in FIGS. 7-10, special consideration has been found desirable in laying out the source and detector locations in order to secure composite seismograms which ultimately will give continuous coverage of the subsurface segments. More particularly, the sending stations, such as stations 1-6 of FIG. 7, were established at intervals of one-third of a mile (1,760 feet). The spread of detector stations was then located as to extend approximately from one-third of a mile from a given sending station to one mile therefrom. More particularly, in FIG. 7 when seismic waves were generated as by the impact of a weight 140 on the earth's surface at station 1, the spread was located between sending stations 2 and 4. More particularly, the first detecting station, such as station 11 of FIG. 1, was centered 147 feet to the right (as viewed in FIG. 7) of the center of sending station 2. Detecting stations, such as detecting stations 16 and 17, were centered 147 feet to the left and to the right respectively of the center of sending station 3. The remote detecting station, such as station 22 of FIG. 1, was centered 147 feet to the left of the center of sending station 4. The distance between centers of the detector patterns 11-22 was thus made about 293 feet. With such an array, the operations indicated in FIGS. 7-10 were carried out to produce data for production of four composite records such as record 112, FIG. 3. Thereafter by proper mixing of the end traces on the four records, such as record 112, subsurface tie points were assured so that the segments A, B, C, and D of FIGS. 7-10 could be followed from record to record with certainty.

While in FIG. 2 adjustment for alignment of timing markers has been indicated to be manual by use of the adjusting wheels 77-80, it is to be understood that this adjustment may be wholly automatic. More particularly, the four divisions 130, 131, 132, and 133 of unit 81 may include servomechanisms such as are well known to those skilled in the art, each being responsive to the difference in time between the appearance of a signal on channel 86 and one timing marker signal from drums 65, 66, 68, or 69 as they appear on channels 82-85. For example, division or unit 130 is responsive to the initial or start signal on channel 86 and the timing marker or terminal signal on channel 82. More particularly, there is transmitted to unit 130 a start signal from drum or element 67 which is representative of position coincidence between the timing marker on the record on drum 67 and the reading head 74. Unit 130 then begins generation of a timing function which is terminated in response to a signal on channel 82. The terminal signal on channel 82 is representative of a position coincidence between the timing marker on the record on drum 65 and reading head 72. The servomechanism may then be responsive to the timing function and operate by way of a mechanical linkage 134 extending to the adjusting means 77 to reduce to a minimum the difference between time coincidences of the elements 65 and 67 and reading heads 72 and 74 respectively, i.e., the signals on channels 86 and 82. Similarly, unit 131 through mechanical linkage 135 may reduce to a minimum or to zero the difference between the signals on channels 86 and 83. Unit 132 through linkage 136 may automatically compensate for time difference between the signals on channels 86 and 84. The unit 133 through linkage 137 may compensate for time difference between signals on channels 86 and 85. The linkages 134-137 have been but schematically indicated, it being understood that suitable means may be provided such as well known by those skilled in the art to transmit the necessary mechanical correcting functions to the drums for rotating drums 65, 66, 68, and 69 relative to shaft 71 and drum 67 to corrected positions and to maintain the same at such corrected positions for simultaneous reproduction of signals on all drums 65-69.

While the invention has been described in connection with certain specific embodiments thereof, it will now be understood that further modifications will suggest themselves to those skilled in the art and it is intended to cover such modifications as fall within the scope of the appended claims.

What is claimed is:

1. In a seismic exploration, the method which comprises sequentially generating seismic waves at each of a plurality of points spaced along a first line and at points spaced along a second line, following generation of said waves at each of said points simultaneously detecting and separately recording the resultant waves arriving at a plurality of detecting stations spaced one from another along a detecting spread extending perpendicular to said first and second lines to produce a plurality of multisignal records, directly combining, in the absence of any changes in relative time-phase relationships between them, the signals from each detecting station from the records of waves generated along said first line to produce a first multisignal composite record, directly combining, in the absence of any changes in relative time-phase relationships between them, the signals from each detecting station from the records of waves generated along said second line to produce a second multisignal composite record, adjusting the relative time-phase relationships of signals on said composite records for the differences in the distances between said first and second lines and said detecting stations to produce first and second corrected multisignal composite records, and combining the signals from each detecting station on said corrected composite records to produce a final multisignal composite record.

2. In seismic exploration, the method which comprises sequentially generating seismic waves at each of a plurality of points spaced along a plurality of parallel lines spaced from one another and lying within the area of a sending station, following generation of said waves at each of said points detecting and separately recording the resultant waves arriving at a plurality of detecting stations spaced one from another along a detecting spread extending perpendicular to said lines, directly combining and recording, in the absence of any changes in relative time-phase relationships between them, the signals from each detecting station from the records of waves generated along one of said lines to produce a first composite record, similarly directly combining and recording, in the absence of any changes in relative time-phase relationships between them, the signals from each detecting station from the records of waves related to the remaining ones of said lines to produce a composite record related to each of said remaining lines, adjusting the relative time-phase relationships of signals on said composite records for differences in the distances between said lines and said detecting stations to produce a plurality of corrected composite records, and combining the signals from each detecting station on said corrected composite records to produce a final composite record.

3. In seismic exploration, the method which comprises sequentially generating seismic waves at each of a plurality of points spaced along a first line and then at points spaced along a second line, following generation of said waves at each of said points simultaneously detecting and separately recording the resultant waves arriving at a plurality of detecting stations spaced one from another along a detecting spread extending perpendicular to said first and second lines, reproducing the signals on the records of waves generated along said first line, directly combining and recording, in the absence of any changes in relative time-phase relationships between them, the reproduced signals corresponding to waves arriving at given detecting stations to produce a first multisignal composite record, reproducing the signals on the records of waves generated along said second line, directly combining and recording, in the absence of any changes in relative time-phase relationships between them, the reproduced signals corresponding to waves arriving at given detecting stations to produce a second multisignal composite record, adjusting the relative time-phase relationships of signals on said composite records for differences in distances between said lines and said detecting stations to produce first and second corrected multisignal composite records, and reproducing and combining the signals on said corrected composite records to produce a final multisignal composite record.

4. In seismic exploration, the method which comprises sequentially generating seismic waves at each of a plurality of points spaced along lines lying parallel to one another, following generation of said waves at each of said points detecting and separately recording resultant waves arriving at a plurality of detecting stations spaced one from the other along a line perpendicular to said lines to produce a plurality of multichannel records, directly combining, in the absence of any changes in relative time-phase relationships between them, the signals from each detecting station from the records of waves generated along each of said lines to produce a plurality of multichannel composite records, adjusting the relative time-phase relationships of signals on said composite records for normal moveout to produce a plurality of corrected multichannel composite records, and combining the signals from each detecting station on said corrected composite records to produce a final multichannel composite record.

5. In seismic exploration wherein seismic waves are sequentially generated at each of a plurality of spaced points in an area defining a sending station and are detected at a plurality of detecting stations in a line along a detecting spread extending away from the sending station, and wherein seismic signals produced by said detecting stations are separately recorded, the method which comprises directly combining in the absence of any changes in relative time-phase relationships between them the recorded signals from each detecting station resulting from seismic waves generated at a plurality of points in said area of said sending station extending along a line perpendicular to the detecting spread to produce a first multisignal composite record, directly combining, in the absence of any changes in relative time-phase relationships between them, the recorded signals from each detecting station resulting from seismic waves generated at a second plurality of points extending along a second line perpendicular to the detectors and spaced from said first line to produce a second multisignal composite record, adjusting the relative time-phase relationships of signals on said composite records for the differences in the distances between said first and second lines and said detecting stations to produce first and second corrected multisignal composite records, and combining the signals from each detecting station on said corrected composite records to produce a final multisignals composite record.

6. In seismic exploration, the method which comprises generating seismic waves at each of a plurality of points spaced along a first line, detecting the resultant waves from the points on said first line at a plurality of detecting stations spaced one from another along a detecting spread on a line extending from approximately the center of said first line and perpendicular to said first line so that each detecting station is approximately equidistant from all the points on said first line, directly combining, in the absence of any changes in relative time-phase relationships between them, the signals resulting from the last named detected waves to produce a first multisignal composite record, generating seismic waves at each of a plurality of points spaced along a second line which is parallel to said first line so that each detecting station is approximately equidistant from all of the points on said second line, detecting the resultant waves from the points on said second line at said detecting stations, directly combining, in the absence of any changes in relative time-phase relationships between them, the signals resulting from the last named detected waves to produce a second multisignal composite record, adjusting the relative time-phase relationships of said first and second multisignal composite records for the differences in the distances between said first and second lines and said detecting stations to produce first and second corrected multisignal composite records, and combining the signals from each detecting station on said corrected composite records to produce a final multisignal composite record.

7. The method in claim 6 wherein the steps of detecting the resultant waves at a plurality of detecting stations include detecting the resultant waves at a plurality of detectors making up each of said detecting stations, said detectors being arranged in radial lines extending from the center of said detecting station which is located on the detecting spread perpendicular to said first and said second lines.

References Cited by the Examiner

UNITED STATES PATENTS

| | | | |
|---|---|---|---|
| 2,473,469 | 6/49 | Dahm | 181—0.5 X |
| 2,759,551 | 8/56 | Carlisle et al. | 181—0.5 |
| 2,841,777 | 7/58 | Blake et al. | 181—.5 X |
| 2,851,121 | 9/58 | McCollum | 181—.5 |
| 2,888,663 | 5/59 | Blake et al. | 340—15 |
| 2,946,393 | 7/60 | Hawkins | 181—.5 |
| 2,953,214 | 9/60 | Merten | 181—.5 |
| 2,980,885 | 4/61 | Mize et al. | 340—15 |
| 2,990,535 | 6/61 | Parkinson et al. | 340—15.5 |
| 3,078,947 | 2/63 | Neitzel | 181—.5 |

OTHER REFERENCES

"Geograph" by McCollum Exploration Co., pages 11, 13 to 17, and 31 to 33 relied on.

Waldie "Sahara Seismic Operations," World Petroleum Magazine, March 1958, pages 42–45.

SAMUEL FEINBERG, Primary Examiner.

CARL W. ROBINSON, LAWRENCE V. EFNER, CHESTER L. JUSTIS, KATHLEEN H. CLAFFY, Examiners.

UNITED STATES PATENT OFFICE
CERTIFICATE OF CORRECTION

Patent No. 3,181,643                                                  May 4, 1965

Gilbert W. Ehlert et al.

It is hereby certified that error appears in the above numbered patent requiring correction and that the said Letters Patent should read as corrected below.

Column 2, line 8, for "multi-signal" read -- multisignal --; column 5, line 70, for "deenergized" read -- de-energized --; column 9, line 8, strike out "a"; column 10, line 58, for "multisignals" read -- multisignal --; column 11, line 16, after "method" insert -- recited --.

Signed and sealed this 28th day of September 1965.

(SEAL)
Attest:

ERNEST W. SWIDER                                      EDWARD J. BRENNER
Attesting Officer                                           Commissioner of Patents